(12) United States Patent
Rao et al.

(10) Patent No.: US 11,137,809 B2
(45) Date of Patent: Oct. 5, 2021

(54) RUNTIME LOCALIZED COOLING OF HIGH-PERFORMANCE PROCESSORS

(71) Applicant: Advanced Micro Devices, Inc., Santa Clara, CA (US)

(72) Inventors: Karthik Rao, Austin, TX (US); Wei Huang, Frisco, TX (US); Xudong An, Irving, TX (US); Manish Arora, Dublin, CA (US); Joseph L. Greathouse, Austin, TX (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 201 days.

(21) Appl. No.: 16/228,036

(22) Filed: Dec. 20, 2018

(65) Prior Publication Data
US 2020/0201404 A1 Jun. 25, 2020

(51) Int. Cl.
*G06F 1/26* (2006.01)
*G06F 1/20* (2006.01)

(52) U.S. Cl.
CPC ............. *G06F 1/206* (2013.01); *G06F 1/26* (2013.01)

(58) Field of Classification Search
CPC ... G06F 1/26; G06F 1/32; G06F 1/324; G06F 1/329; G06F 1/3228; G06F 1/08; G06F 1/206; G06F 1/3203; G06F 1/3215; G06F 1/3231; G06F 1/3206; G06F 1/3296; G06F 1/3234; G06F 1/3237; G06F 1/3287; G06F 1/266; G06K 15/4055; Y04S 20/20; Y02D 10/00; H04L 12/10
See application file for complete search history.

(56) References Cited

U.S. PATENT DOCUMENTS

| 7,293,416 | B2 | 11/2007 | Ghoshal | |
|---|---|---|---|---|
| 7,296,417 | B2 | 11/2007 | Ghoshal | |
| 7,475,551 | B2 | 1/2009 | Ghoshal | |
| 7,508,671 | B2* | 3/2009 | Sauciuc | G06F 1/20 165/104.33 |
| 2005/0002161 | A1* | 1/2005 | Chen | H05K 7/20836 361/679.47 |
| 2011/0072283 | A1* | 3/2011 | Monferrer | H01L 23/38 713/300 |
| 2012/0273920 | A1 | 11/2012 | Fedorov et al. | |
| 2012/0311360 | A1* | 12/2012 | Balasubramanian | G06F 1/3237 713/323 |
| 2015/0082811 | A1 | 3/2015 | Rangarajan et al. | |
| 2016/0334845 | A1* | 11/2016 | Mittal | H01L 23/34 |

OTHER PUBLICATIONS

Biswas, S., et al., "Fighting Fire with Fire: Modeling the Datacenter-Scale Effects of Targeted Superlattice Thermal Management," ACM SIGARCH Computer Architecture News. vol. 39. No. 3. ACM, 2011, pp. 331-340.

(Continued)

*Primary Examiner* — Zahid Choudhury
(74) *Attorney, Agent, or Firm* — Zagorin Cave LLP (57) ABSTRACT

A plurality of thermal electric cooler (TEC) elements are formed in a TEC grid structure. Control logic dynamically varies a supply current supplied to each TEC element (or group of TEC elements) in the TEC grid based on changes in power density respectively associated with areas cooled by each of the TEC elements or group of TEC elements.

20 Claims, 7 Drawing Sheets

(56) References Cited

OTHER PUBLICATIONS

Dousti, M. and Pedram, M., "Platform-Dependent, Leakage-Aware Control of the Driving Current of Embedded Thermoelectric Coolers," Proceedings of the 2013 International Symposium on Low Power Electronics and Design, IEEE Press, 2013, 6 pages.

Lee, S. et al. "Thermoelectric-based sustainable self-cooling for fine-grained processor hot spots," Thermal and Thermomechanical Phenomena in Electronic Systems (ITherm), 2016 15th IEEE Intersociety Conference on IEEE, 2016, 10 pages.

Long, J., et al., "Optimization of an On-chip Active Cooling System Based on Thinfilm Thermoelectric Coolers, Extended Discussion," 2010 EDAA, pp. 6 pages.

Redmond, M., et al., "Hotspot Cooling in Stacked Chips Using Thermoelectric Coolers," IEEE Transactions on Compoments, Packaging and Manufacturing Technology, vol. 3, No. 5, May 2013, pp. 759-767.

Sahu, V., et al., "Energy Efficient Liquid-Thermoelectric Hybrid Cooling for Hot-Spot Removal," 28th Annual IEEE Semiconductor Thermal Measurement and Management Symposium (SEMI-THERM), 2012, 5 pages.

Sahu, V., et al., "Experimental Characterization of Hybrid Solid-State and Fluidic Cooling for Thermal Management of Localized Hotspots," IEEE Transactions on Components, Packaging and Manufacturing Technology, vol. 5, No. 1, Jan. 2015, pp. 57-64.

Sahu, V., et al., "Hybrid solid state/fluidic cooling for hot spot removal." Nanoscale and Microscale Thermophysical Engineering 13.3, 2009, pp. 135-150.

Sahu, V., et al., "Transient Characterization of Hybrid Microfluidic-Thermoelectric Cooling Scheme for Dynamic Thermal Management of Microprocessor." Journal of Electronic Packaging 136.3, 2014, 8 pages.

Shakouri, A., "Nanoscale thermal transport and microrefrigerators on a chip." Proceedings of the IEEE 94.8, 2006, pp. 1613-1638.

Zheng, W. et al., "TECfan: Coordinating Thermoelectric Cooler, Fan, and DVFS for CMP Energy Optimization," 2016 IEEE International Parallel and Distributed Processing Symposium, 10 pages.

* cited by examiner

| | |
|---|---|
| $T_{ss}$ | Steady State Temperature |
| $\Delta P_{den}$ | Change in Power Density |
| $\mu$ | Control Input: SLC Current |
| $T_{ref}$ | Reference Temperature |

RUNTIME LOCALIZED COOLING OF HIGH-PERFORMANCE PROCESSORS

STATEMENT REGARDING FEDERALLY SPONSORED RESEARCH OR DEVELOPMENT

This invention was made with Government support under the PathForward Project with Lawrence Livermore National Security (Prime Contract No. DE-AC52-07NA27344, Subcontract No. B620717) awarded by DOE. The Government has certain rights in this invention.

BACKGROUND

Description of the Related Art

Modern high-performance processors can easily dissipate more than 100 W of power. The heat generated by the processors varies both spatially and temporally. Depending on the nature of the workload, different locations on the die can have a heat flux far greater than the spatial average heat flux of the die. Furthermore, the heat flux can vary in time as well. The hot-spots thus generated can result in localized spikes in temperature. However, the spatial average temperature across the die can remain below the maximum sustainable value. While the location of temperature sensors is determined based on studies conducted offline, the temperature sensors are not always located close to the actual runtime hot-spots and thus may not accurately reflect hot-spot temperature.

It is well known that hot-spots reduce the lifetime-reliability of the device significantly. The other important side effect of hot-spots is the need to design for the worst-case heat scenario. That results in not only the local heat sink being overprovisioned, but causes the air conditioners in data centers to be designed to handle heat fluxes that are rarely actually observed. Millions to billions of dollars are spent on the cooling infrastructure in data centers that is, more often than not, underutilized.

Various hardware and software techniques have been implemented or proposed to manage temperature dynamically. Architectural and microarchitectural modifications such as instruction fetch throttling attempts to reduce power consumption when a threshold temperature is crossed. Reigning in dissipated power via Dynamic Voltage Frequency Scaling (DVFS) of the cores and/or memory units has been studied extensively and is still an open research area. Thread scheduling and migration between cores is a software technique aimed at maintaining a balanced thermal field. Techniques employing DVFS typically assume either spatial or temporally averaged temperatures and deal with worst case thermal management. As noted earlier, even though the processor temperature sensor may show a particular temperature, e.g., 85° C., localized hot-spot temperatures can be much higher. Current processors try to maximize the thermal budget by increasing the core frequencies whenever thermal headroom is available. These techniques heavily rely on the heat sink's ability to remove the heat generated.

The system integrators are assigned the task of designing a heat sink that is cheap to manufacture and can reliably dissipate the heat. The general strategy, once again, is to design for the worst case. Existing cooling mechanisms such as heat spreaders, cold plates, heat pipes, and microchannel heat sinks are typically designed only for uniform heat extraction. Furthermore, in an effort to reduce manufacturing costs, some system integrators choose lower grade materials for the heat sink, which leads to reliability issues. Microfluidic cooling, while attractive, requires a non-trivial amount of effort to etch the channels and would also require significant changes in the packaging process. Thus, improved mechanisms to dissipate heat associated with operation of integrated circuits are desirable.

SUMMARY OF EMBODIMENTS OF THE INVENTION

Accordingly, in order to provide greater cooling flexibility, reduce overall cooling costs and provide for runtime localized cooling in one embodiment, an apparatus includes a plurality of thermal electric cooler (TEC) elements formed in a grid. First control logic dynamically varies a supply current for a first TEC element in the grid according to a first change in first power density associated with a first area cooled by the first TEC. Second control logic dynamically varies a second supply current for a second TEC element in the grid according to a second change in second power density associated with a second area cooled by the second TEC.

In another embodiment, a method includes determining a first supply current for a first thermal electric cooler (TEC) element in a TEC grid of TEC elements according to a first change in power density associated with a first area cooled by the first TEC element. The first supply current is supplied to the first TEC element to control cooling of the first TEC element. A second supply current is determined for a second TEC element in TEC grid according to a second change in power density associated with a second area cooled by the second TEC element. The second supply current is supplied to the second TEC element in the TEC grid to control cooling of the second TEC element.

In another embodiment, an apparatus includes a plurality of thermal electric cooler (TEC) elements formed in a TEC grid. Control logic is configured to dynamically vary a supply current supplied to one TEC element in the TEC grid according to a change in power density respectively associated with an area cooled by the one TEC element. The change in power density is based, in part, on a size of an area being cooled by the one TEC element. The control logic is configured to generate a steady state temperature based on the change in power density and to compare the steady state temperature to a reference temperature and generate an error signal indicative thereof and the supply current is varied according to the error signal.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DETAILED DESCRIPTION

Modern processors can generate average heat fluxes in the range of 100 W/cm$^2$. However, localized hot-spot heat fluxes can be significantly higher, e.g., up-to 800 W/cm$^2$. Such spatially variable heat fluxes have drastic differences in temperature (~30° C.). Traditional heat sink design with air and liquid cooling fail to effectively cool isolated hot-spots. Solid state cooling using an array of thin-film thermoelectric coolers (TECs) known as SuperLattice Coolers (SLCs) are effective at cooling local hot spots. Using principles from feedback control theory, embodiments herein provide a dynamic thermal management solution based on solid-state cooling. Embodiments combine solid state cooling with other cooling techniques. Distributed feedback controllers control the supply current to a grid of SLCs to regulate the temperature of specific regions, for example, well known hot-spots or spatially and temporally varying hot-spots.

Since temperature rise time and steady state value at a given location is influenced largely by only the change in local power density, targeted localized cooling, governed by formal control theoretic principles (i) saves energy spent in cooling, (ii) improves performance, (iii) effectively utilizes thermal headroom and (iv) improves device reliability. SLCs themselves are based on silicon and germanium. Therefore, SLCs can be formed onto the backside of heat sinks such as microchannel liquid cooling heat sinks, thus making use of SLCs cost effective as well. Alternatively, since SLCs are based on Si/SiGe layers, certain embodiments integrate the SLCs directly onto the silicon die during manufacturing. In other embodiments, SLCs are formed separately from the die and heat sinks. Actuating a particular SLC requires just two terminals (for input current and output current), allowing for a relatively simple control structure.

Improved cooling approaches for graphics processing units (GPUs), central processing units (CPUs), and accelerated processing units (APUs), particularly in the server market, can not only increase performance for data center applications but can also reduce the cost of provisioning data centers due to reduced cooling requirements.

Figure 1:
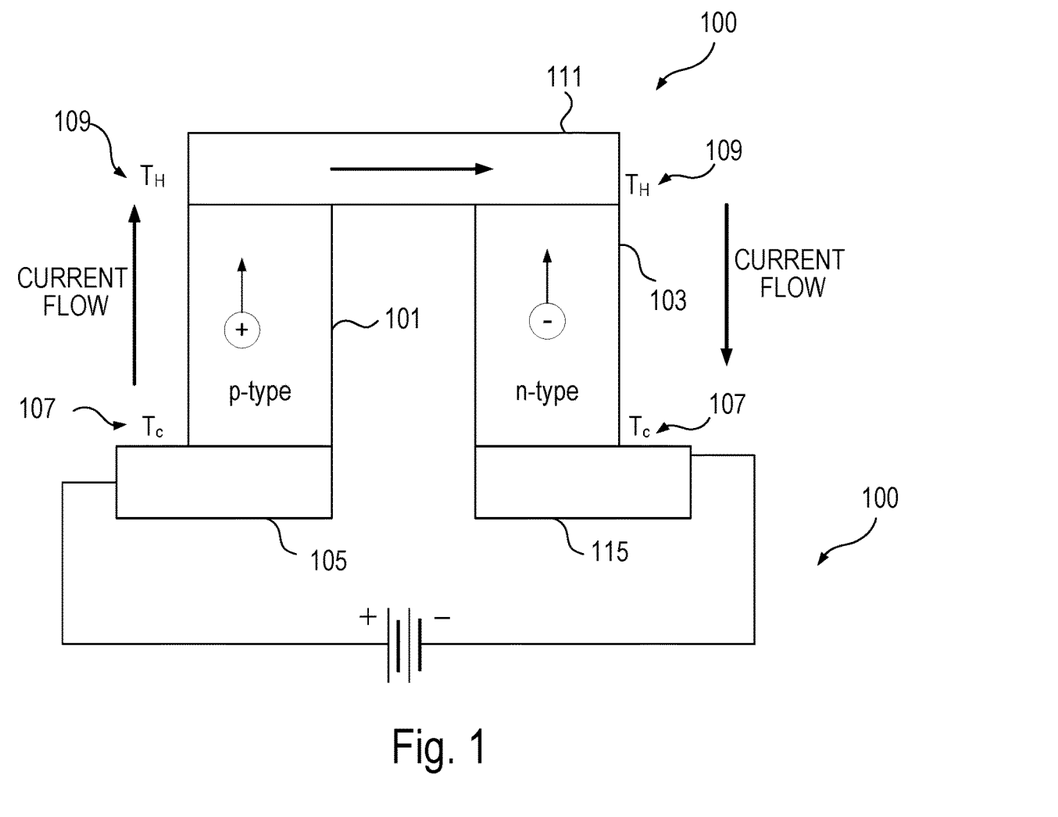
FIG. 1 illustrates the basic functioning of a TEC.

FIG. 1 illustrates the basic functioning of a TEC 100. A TEC is a solid-state active heat pump that moves heat from the cold side to the hot side of the TEC when an electric current flows between the cold side and the hot side. The TEC 100 includes a p-type semiconductor portion 101 and an n-type semiconductor portion 103 coupled in parallel thermally and in series electrically. The current is applied to the cold side at electrical contact 105 and flows as p-type carriers (holes) from the cold side 107 ($T_C$) to the hot side ($T_H$) 109. Current flows across the electrical contact 111 electrically connecting the hot sides 109 of the p-type portion 101 and the n-type portion 103. In the n-type portion 103 carriers (electrons) flow from the cold side 107 to the hot side 109, while current flows in the opposite direction from the hot side 109 towards the contact 115. In that way heat is moved from the cold side to the hot side where the heat is dissipated. The device to be cooled is thermally coupled to the cold side (and electrically insulated) and the heat at the hot side is dissipated using, e.g., a conventional heat sink, to remove heat from the hot side 109.

Figure 2:
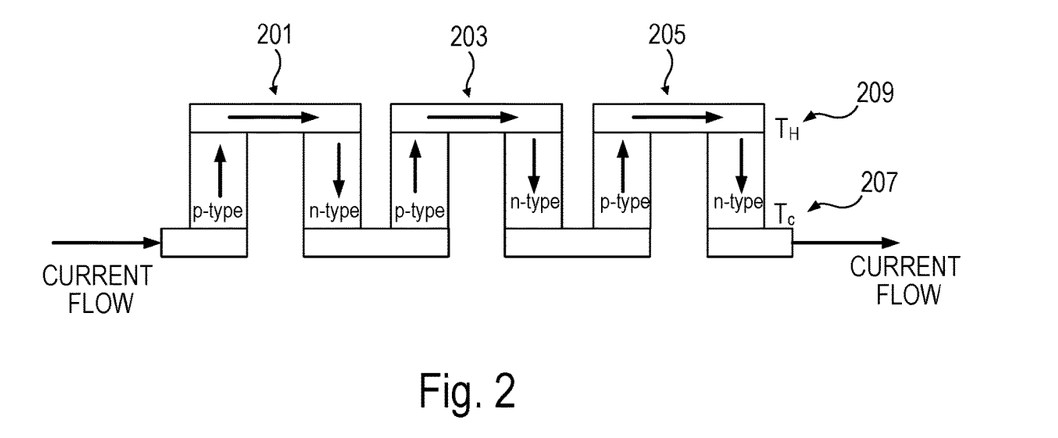
FIG. 2 illustrates a TEC with three p-type and n-type thermal electric couples that are electrically in series and thermally in parallel.
Figure 3:
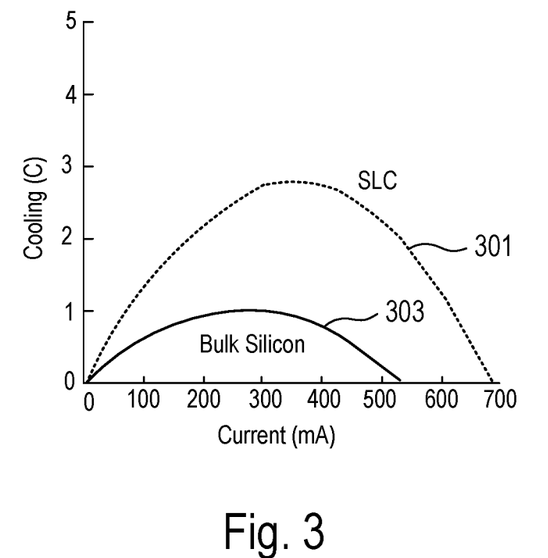
FIG. 3 illustrates the cooling achieved with an SLC and a TEC formed with bulk silicon.

FIG. 2 illustrates a TEC with three parallel p-type and n-type thermal electric couples 201, 203, and 205 serially coupled electrically and in parallel thermally to move heat from the cool side 207 to the hot side 209. The number of thermal electric couples utilized in a particular implementation depends on the cooling needs and control structure for the particular implementation. Instead of using bulk silicon for the TEC, embodiments utilize SLC structures that increase the magnitude of cooling of the TEC. SLCs have multiple Si and SiGe layers. FIG. 3 compares SLC cooling 301 with cooling 303 achieved using a bulk silicon TEC. Note that the cooling efficiency starts to decrease for the SLC and the TEC formed with bulk silicon after a certain value of supply current due to Joule heating. Embodiments herein use TECs formed using bulk silicon or SLCs based on the needs of the particular implementation.

Figure 4A:
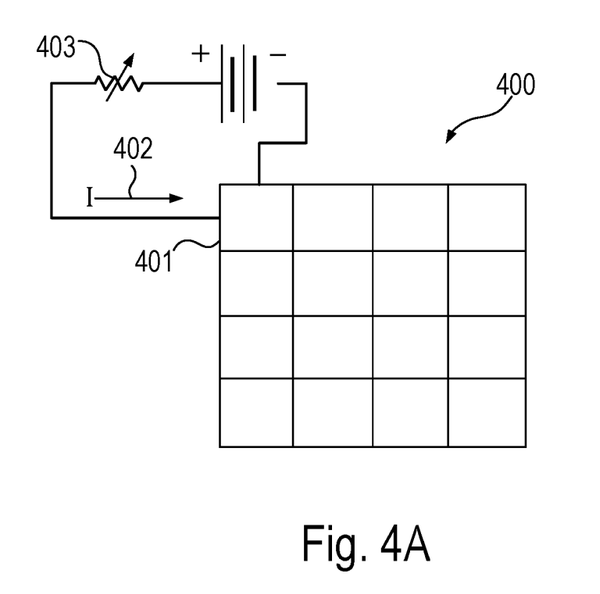
FIG. 4A illustrates a grid of SLC coolers according to an embodiment.

Referring to FIG. 4A, embodiments herein utilize a closed-loop accurately controlled mechanism to fully exploit the potential of SLCs. Instead of placing SLCs over pre-determined hotspots, embodiments use a grid (also referred to herein as an array) 400 of SLCs formed by individually controllable SLC grid elements or squares, one of which is labeled 401. Note that the use of the term square is for convenience and does not imply that the shape of a grid element is necessarily square. A controller dynamically varies the supply current 402 to each square during runtime based on a control function that varies the supply current based on local cooling requirements. The control signal for square 401 is represented by the variable resistance 403. Thus, rather than supplying a current that is either on or off, the control structure varies the current according to the cooling needs of the area being cooled as explained further herein. The more current that is supplied to the SLC square, the greater the cooling supplied by the SLC square although FIG. 3 illustrates there are limits to the amount of current supplied above which increased cooling is no longer achieved. One SLC square (or group of squares) can receive maximum cooling while other squares are supplied lower currents or are completely off. Embodiments utilize SLC grids with different granularities in terms of the number and size of the SLC squares forming the grid. The SLC grid is designed according to, e.g., the physical hot spot size, the size of the component, and/or the size of silicon areas that are most sensitive to high temperature. Thus, each square can be smaller than 1 mm² or as large as the entire die area, thus, hundreds of mm². The number of squares can vary from a few squares to 16, 64, or any suitable number based on the requirements of the application.

Figure 4B:
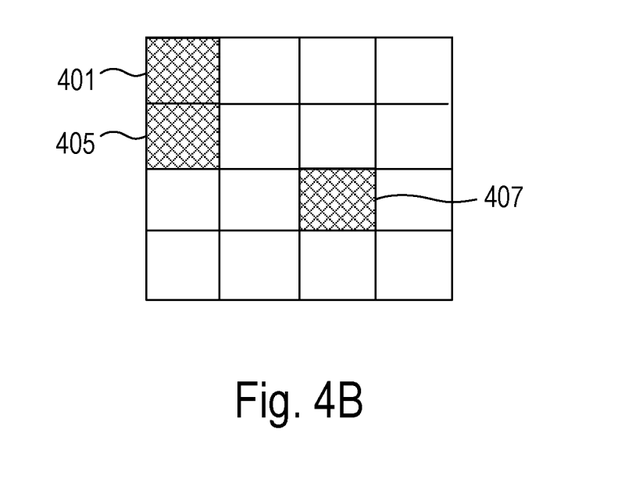
FIG. 4B illustrates clustering of SLC grid squares.

In embodiments, rather than controlling a single square, the control logic controls clusters of SLC squares as shown in FIG. 4B. In embodiments the clusters are logical clusters in that the same current is supplied to each square 401 and 405 by the controller. The clustered squares may be adjacent as shown by squares 401 and 405 but non-contiguous SLC squares may also be clustered, particularly in logical clusters. Thus, SLC square 407 may be clustered with one or both of SLC squares 401 and 405.

Figure 5:
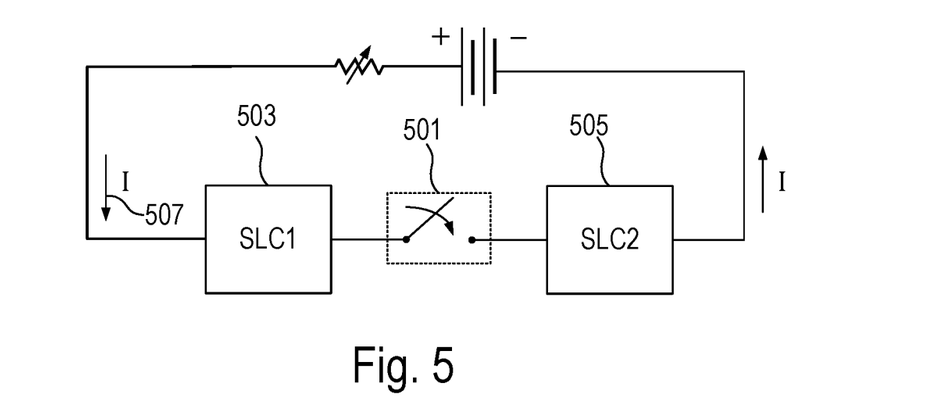
FIG. 5 illustrates physical clustering of two SLC squares.

In embodiments, rather than being logically clustered, the clusters are physically linked. FIG. 5 illustrates an embodiment in which switch 501 selectively links SLC1 503 and SLC2 505. If the switch 501 is closed, the SLC squares 503 and 505 are serially linked and the current 507 supplied to SLC1 square 503 is also supplied to SLC2 square 505. In embodiments, switch 501 is dynamically controlled during runtime depending on cooling needs. For example, in embodiments, the larger cluster is formed to cool regions of a processor having the same thermal profile during runtime. While FIG. 5 shows only two squares being physically clustered, other embodiments utilize a different number of clustered SLC squares suitable for the particular application.

Figure 6:
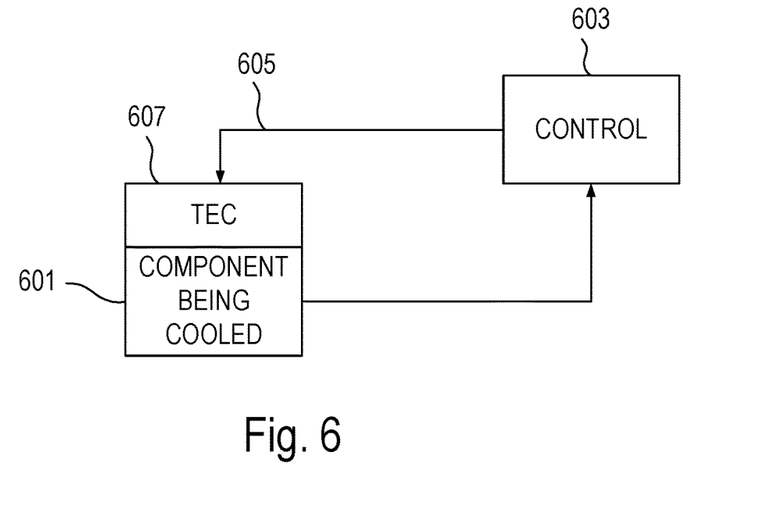
FIG. 6 illustrates a high level block diagram of the control structure for an SLC square.

Embodiments herein address the problem of cooling spatially and temporally varying hot-spots using an SLC grid and concepts from feedback control theory. A distributed controller framework modulates the supply current to elements of an SLC grid structure to regulate the temperature of different locations of the die to a reference temperature for the location. The feedback controllers use local power density information and/or local temperature sensor readings at runtime. FIG. 6 illustrates a high level block diagram of the control structure. The component being cooled 601 supplies the control function 603 with local power density information and/or local temperature sensor readings. The control function 603 supplies the control signal 605 (variable supply current) to adjust the cooling provided by TEC 607. That control structure is implemented for each SLC square (or cluster of SLC squares) in the grid. The result is lower hot-spot temperatures and less thermal gradient across the die. Therefore, the SLC grid approach leads to a more tightly controlled performance target, a longer silicon lifetime, and potentially lower cost and power at the datacenter level as better device cooling simplifies facility-level cooling complexity.

Figure 7:
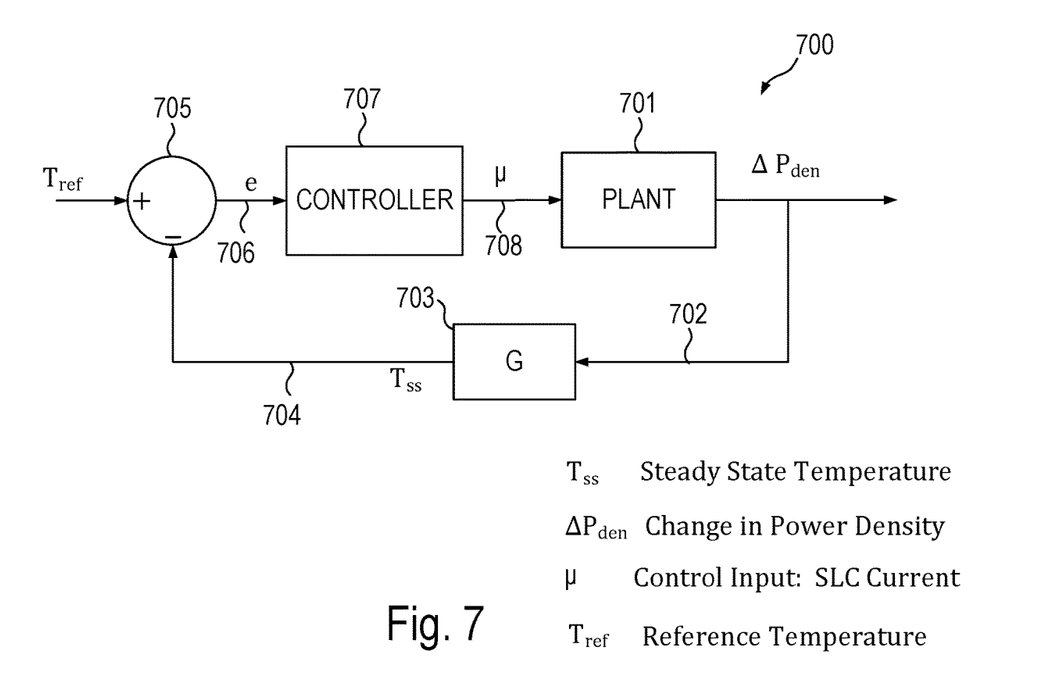
FIG. 7 illustrates additional details of an embodiment of a feedback control structure for each SLC square.

Embodiments use formal feedback control to vary the supply current of the SLC squares individually based on the change in local power density. That provides fine-grain control of the SLC array and allows for greater durations of increased processor performance when needed. FIG. 7 illustrates an embodiment of the feedback control structure 700 for each SLC square or SLC cluster. The control structure 700 utilizes a local power density change ($\Delta P_{den}$) of individual components or subblocks within plant 701. The local power density change ($\Delta P_{den}$) is based on hardware performance counters (or other mechanisms to provide power usage reactively or predictively) along with area (mm²) of the individual components or subblocks within plant 701 being cooled.

Hardware performance counters measure activity in portions of the integrated circuit. For example, in an embodiment the performance counter measures how many times a particular signal line in a logic block toggled. Toggling of that particular signal line indicates use of the logic block and therefore corresponds to power consumption. The use of change in power density based on performance counters is predictive of future temperature increases rather than reactive to an actual increase. Other embodiments measure power directly from the voltage regulators or measure temperature directly. However, measuring temperature is problematic in that the change in cooling is reactive to the change in temperature rather than predictive. Additionally, temperature measurements may not accurately reflect hot spots in the integrated circuit. In still other embodiments, a power utilization prediction is based on prior power utilization patterns. In a simple example, if a floating point unit was used in a pattern of 100 µs on and 100 µs off, the change in power density power assumes that pattern continues. Thus, while reactive cooling is used in some embodiments of the SLC cooling, other embodiments that utilize predictive cooling based on $\Delta P_{den}$ using performance counters or other predictive measures provide lower average temperatures and therefore potentially greater performance and lower data center cooling costs.

The plant 701 corresponds to the component being cooled and the SLC array and supplies the change in power density information ($\Delta P_{den}$). Embodiments use performance counters or other predictive mechanisms to generate $\Delta P_{den}$. The feedback gain block 703 generates a steady state temperature Tss 704 based on the change in power density $\Delta P_{den}$ 702 supplied by the plant 701. The particular gain used in gain block 703 depends on such factors as the location being cooled. The steady state temperature represents the anticipated steady state temperature after the transient increase in temperature is complete without additional cooling. Note that the change in power density and the steady state temperature are local in the spatial sense. That is, the change in power density is associated with a particular integrated circuit (or portion thereof) being cooled by one (or a group) of the SLC squares.

Figure 8:
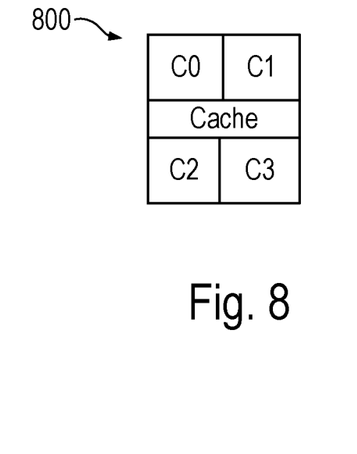
FIG. 8 illustrates an embodiment in which a change in power density is provided at the granularity of a core in a multi-core die.
Figure 9:
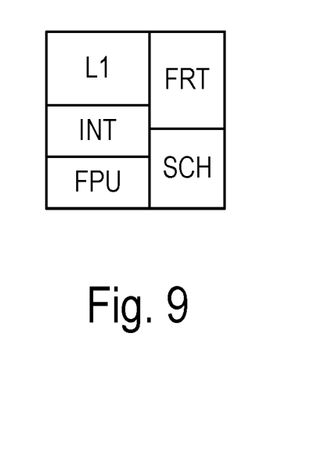
FIG. 9 illustrates an embodiment in which a processor core provides the change in power density for various modules within the core.

Modern processors have the capability to measure energy consumption per-core thereby allowing for fairly accurate measurement of instantaneous power. For example, referring to FIG. 8, a die 800 provides a change in power density for each of the processor cores C0, C1, C2, and C3 along with the cache. Coupled with the dimension of the core area, local power density and changes in power density can be determined. Referring to FIG. 9, in an embodiment a core provides the change in power density with more granularity, e.g., a change in power density is provided for each module in a processor core such as the L1 cache, the integer unit (INT), the floating point unit (FPU), the front end (FRT) and the scheduler (SCH).

Referring back to FIG. 7, a summing circuit 705 compares the steady state temperature Tss 704 to a reference temperature Tref and generates an error term 706. The reference temperature is based on a single value for the entire die area or is based on a particular physical location of the area being cooled. Some portions of the die, e.g., where the compute units are located, can be expected to run hotter than certain peripheral regions of the die. The error term 706 is supplied to a controller 707. In an embodiment the controller 707 is a fixed gain proportional integral derivative (PID) controller or an adaptive gain controller or a robust controller that guarantees a particular output. The controller 707 supplies a control term µ 708 that represents the supply current for a particular SLC square (or cluster of SLC squares). Each of the SLC squares or clusters in the grid have separate control.

Given the relative slow nature of temperature excursions, the same control hardware and software can be time multiplexed to provide the appropriate control functionality for each SLC square or cluster.

In embodiments, the control functionality described in FIG. 7 and shown in FIG. 6 as control 603 is implemented in a programmed processor. In embodiments, the control functionality is implemented as a software driver that runs on one of the central processing units of a processor being cooled by the SLC array. The driver software is stored in volatile and/or non-volatile memory and is available on boot up of the system. In other embodiments, a programmed firmware controller located in the die that includes the main processor(s) provides the control functionality described in FIG. 7 and utilizes firmware stored in a location in the computer system that is accessible to the firmware controller that implements the control functionality. In still other embodiments, the control functionality is implemented in a management controller processor located outside of the main processor(s) die, e.g., in a baseboard management controller (BMC). In such an embodiment, the software is stored in memory in the computer system, e.g., on the main circuit board, such that it is available to the BMC. The software required to implement the control functionality in the various embodiments described above is stored in non-transitory memory in the computer system, e.g., in non-volatile memory or other types of non-transitory memory.

Figure 10:
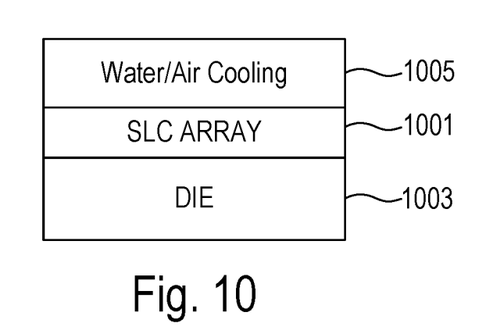
FIG. 10 illustrates a high level block diagram of an embodiment of a cooling system utilizing an SLC array.

FIG. 10 shows a high level block diagram of an embodiment of a cooling system utilizing an SLC array 1001. The die 1003 (one or more die) are directly cooled by the SLC array and a heat sink 1005 that is thermally coupled to the SLC array 1001 removes heat from the hot side of the SLC array. While the SLCs squares in the array provide targeted cooling for spatially and temporally varying hotspots for the die, the cooling on top of the SLC grid effectively transports the heat away from the SLC array. The cooling may utilize water (or other liquid) for transporting the heat away from the SLC grid or a conventional heat sink with fins to allow the heat to be transported away using air, or another heat removing mechanism. Thus, embodiments utilize a hybrid of solid-state and an additional cooling mechanism, the additional cooling mechanism being used to transport heat away from the SLC array.

Figure 11:
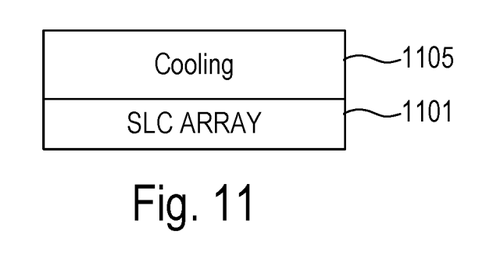
FIG. 11 illustrates an embodiment in which the cooling structure and SLC array are formed as an integral unit.
Figure 12:
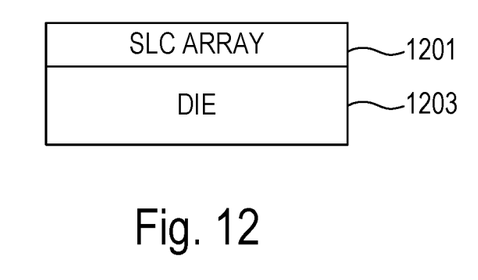
FIG. 12 illustrates an embodiment in which the SLC array and the die are formed as an integral unit.

In embodiments, the SLC array or grid structure 1001 is formed separately from the water/air cooling structure 1005 and separately from the die 1003. Referring to FIG. 11, in other embodiments the SLC array 1101 and the cooling structure 1105, are formed as an integral unit. In an embodiment with the SLC array integral with the cooling structure, the supply current connections for each of the SLC squares are external to the die. The simple control structure for controlling programmable current sources is external to the die. In still other embodiments, as shown in FIG. 12, the SLC array 1201 and the die 1203 are formed as an integral unit. In such a case, in embodiments the programmable current sources reside in the die and the die supplies the current directly to the SLC array through vias connecting the die and the SLC array (not shown in FIG. 12). In other embodiments where the SLC array is integral with the die, the programmable current sources remain external to the die.

Figure 13A:
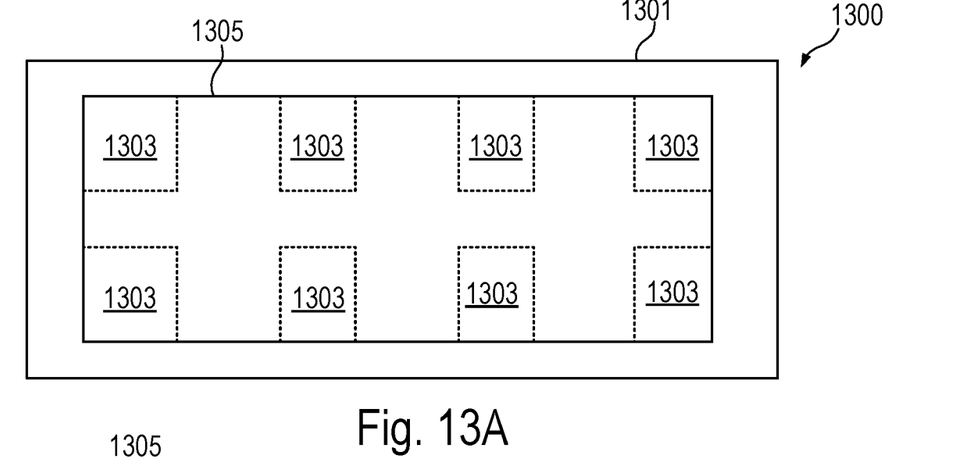
FIG. 13A is a top view of a system using a silicon interposer, a plurality of die, and an SLC array to cool the die.
Figure 13B:
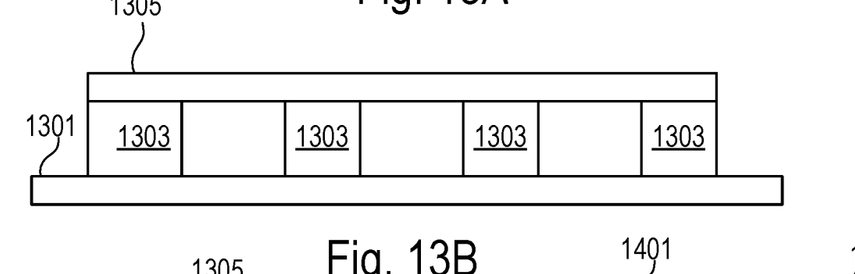
FIG. 13B is a side view of a system using a silicon interposer, a plurality of die, and an SLC array to cool the die.

The SLC grid structure can be particularly useful for designs that utilize a silicon interposer and variable integrated circuits coupled to the silicon interposer based on a target market. A silicon interposer can achieve faster communication between die. Referring to FIG. 13A a top view shows a silicon interposer 1301 coupled to a plurality of integrated circuit die 1303 and an SLC grid 1305 thermally coupled to the integrated circuit die 1303. FIG. 13B shows a side view of the system showing silicon interposer 1301, die 1303, and SLC grid 1305. The integrated circuit die may include various types of processors, memory, and other integrated circuits that are advantageously coupled to the silicon interposer.

Figure 14A:
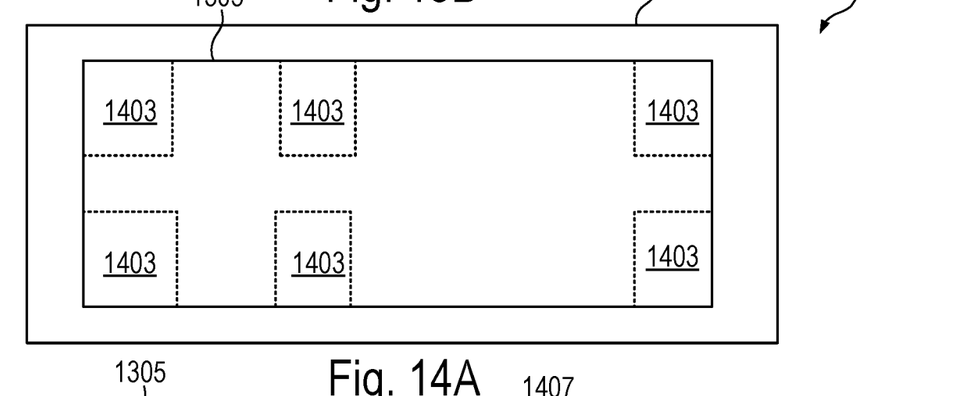
FIG. 14A is a top view of a system using a silicon interposer, a plurality of die, and an SLC array to cool the die.
Figure 14B:
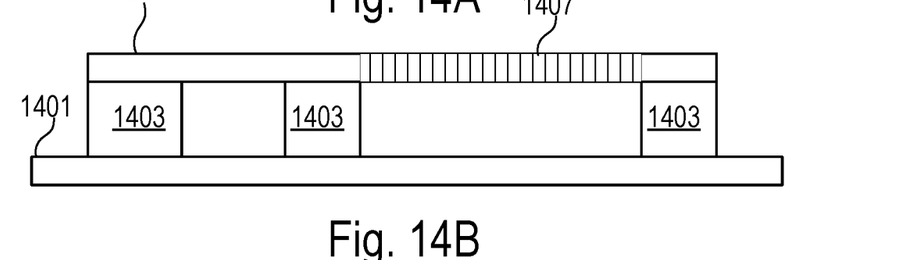
FIG. 14B is a side view of a system using a silicon interposer, a plurality of die, and an SLC array to cool the die.

FIG. 14A illustrates a design that also includes interposer 1401. The same SLC grid 1305 is utilized but different types and/or quantity of die are coupled to the interposer. Referring to FIG. 14A a top view shows a silicon interposer 1401 coupled to a plurality of integrated circuit die 1403 and the SLC grid 1305 thermally coupled to the integrated circuit die 1403. FIG. 14B shows a side view of the system showing silicon interposer 1401, die 1403, and SLC grid 1305. The integrated circuit die 1403 may include various types of processors, memory, and other integrated circuits that are advantageously coupled to the silicon interposer. In embodiments, the die 1403 are identical die to the die 1303 but omit several of the die for a different target market. In other embodiments, die 1403 differ from die 1303. However, the same SLC grid array is used for system 1300 and 1400 because those SLC squares shown at 1407 are turned off or supplied with a relatively low current as compared to those SLC squares above active integrated circuit. Thus, a separate SLC grid does not need to be designed for a different configuration of die on an interposer. Instead, the fine grained control of the individual squares allows the grid structure to be applied to a wide variety of designs and software control can be effectively utilized to adjust control of the grid for each design environment.

Figure 15:
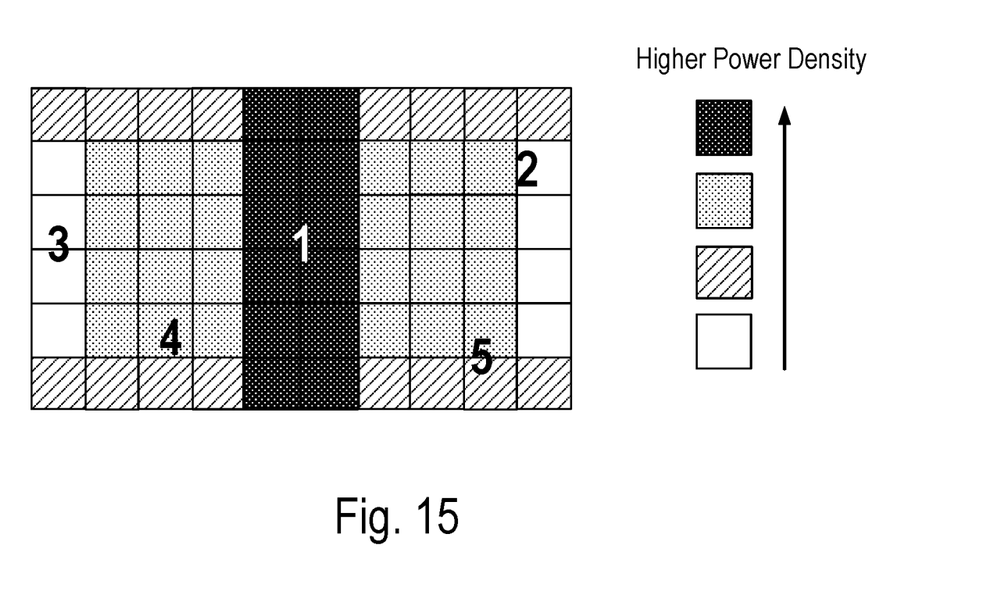
FIG. 15 illustrates power utilization of an integrated circuit under a first set of conditions.
Figure 16:
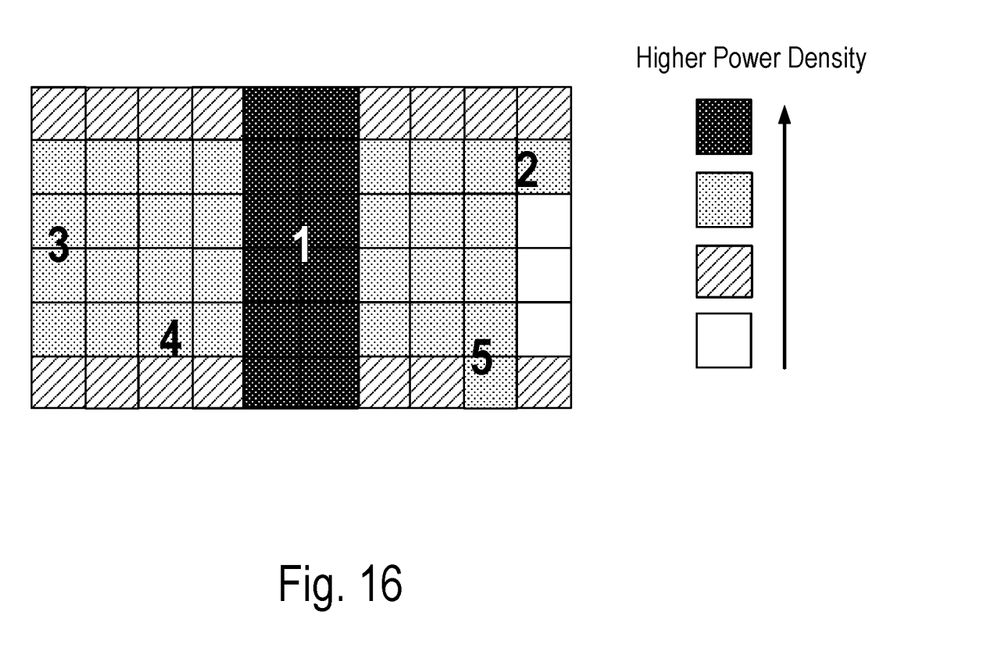
FIG. 16 illustrates power utilization of an integrated circuit under a second set of conditions.

FIGS. 15 and 16 illustrate power utilization for an integrated circuit under changing conditions. FIG. 15 illustrates a first power utilization. Most of the heat is generated in the center portion of the die where all the compute units are concentrated in both scenarios. In FIG. 16, additional power is being consumed. While locations 1 and 4 do not change their local power density, between locations 2, 3 and 5 share the extra power. The change in power density in the descending order is 3>2>5. The area 3 changes because, e.g., an input/output area or other functionality of the integrated circuit was turned on. Note that hot spot temperature depends strongly on local power density and changes rapidly. Using power density changes based on performance counters that identifies when the area around location 3 goes from no use to being used allows proactively cooling location 3 before the location heats above the reference voltage thereby providing a cooling solution that quickly adapts to changing conditions. Temperature dynamics are much slower as compared to power. Therefore, by the time a control algorithm "reacts" to the rise in temperature, it could be too late to prevent a temperature increase above the target temperature thereby potentially adversely affecting other operations in the integrated circuit due to loss of thermal budget. Rapidly estimating the steady state temperature based on local power density changes allows a control algorithm to preemptively take corrective action. Equipped with the information about local steady state temperature, a more targeted cooling technique using an SLC grid with individualized dynamic current control for grid squares provides improved cooling for any silicon die which requires heat to be removed for normal operation. Traditional heat sink designs are either considerably slower or simply incapable of addressing such changing conditions.

Thus, embodiments have been described that utilize an SLC grid with individualized dynamic current control for grid squares. While the description has been focused on TECs formed as SLCs, the embodiments described herein can also be utilized with TECs formed with bulk silicon. The description of the invention set forth herein is illustrative, and is not intended to limit the scope of the invention as set forth in the following claims. Variations and modifications of the embodiments disclosed herein, may be made based on the description set forth herein, without departing from the scope of the invention as set forth in the following claims.

What is claimed is:

1. An apparatus comprising:
   a plurality of thermal electric cooler (TEC) elements formed in a grid;
   control logic to dynamically vary a first supply current for a first TEC element in the grid according to a first change in first power density associated with a first area cooled by the first TEC element;
   the control logic to dynamically vary a second supply current for a second TEC element in the grid according to a second change in second power density associated with a second area cooled by the second TEC element; and
   wherein the control logic is configured to selectively couple together at least two TEC elements of the plurality of TEC elements during run time to selectively provide a path for a first current to flow from one of the at least two TEC elements to another of the at least two TEC elements.

2. The apparatus as recited in claim 1,
   wherein the first change in first power density is determined at least in part based on at least one performance counter associated with the first area; and
   wherein the second change in second power density is determined at least in part based on at least another performance counter associated with the second area.

3. The apparatus as recited in claim 2,
   wherein the first change in first power density is further determined based on a size of the first area; and
   wherein the second change in second power density is further determined based on a size of the second area.

4. The apparatus as recited in claim 1,
   wherein the control logic is configured to generate a first steady state temperature for the first area based on the first change in first power density, compare the first steady state temperature to a first reference temperature and generate a first error signal indicative of the compare, and adjust the first supply current based on the first error signal; and
   wherein the control logic is configured to generate a second steady state temperature for the second area based on the second change in second power density, compare the second steady state temperature to a second reference temperature and generate a second error signal indicative of the compare, and adjust the second supply current based on the second error signal.

5. The apparatus as recited in claim 4 wherein the first reference temperature and the second reference temperature are determined according to, respectively, a location of the first area and the second area.

6. The apparatus as recited in claim 1 wherein at least another element in the grid is controlled by a different current.

7. The apparatus as recited in claim 1 further comprising:
   an interposer:
   a first silicon die coupled to the interposer and disposed under a first one or more TEC elements of the grid;
   a second silicon die coupled to the interposer and disposed under a second one or more TEC elements of the grid; and
   a third one or more TEC elements of the grid disposed above an absence of silicon die.

8. The apparatus as recited in claim 1 further comprising:
   one or more integrated circuit die;
   the grid thermally coupled to the one or more integrated circuit die; and
   another cooling structure thermally coupled to the TEC grid to remove heat from the TEC grid.

9. A method comprising:
   determining a first supply current for a first thermal electric cooler (TEC) element in a TEC grid of TEC elements according to a first change in power density associated with a first area cooled by the first TEC element;
   supplying the first supply current to the first TEC element to control cooling of the first TEC element;
   determining a second supply current for a second TEC element in the TEC grid according to a second change in power density associated with a second area cooled by the second TEC element;
   supplying the second supply current to the second TEC element to control cooling of the second TEC element; and
   dynamically controlling during runtime a path between two TEC elements in the TEC grid to selectively allow a supply current to flow from a first TEC element of the two TEC elements to a second TEC element of the two TEC elements.

10. The method as recited in claim 9, further comprising:
    determining the first change in power density, at least in part, according to a first performance counter associated with the first area and a first size of the first area; and
    determining the second change in power density, at least in part, according to a second performance counter associated with the second area and a second size of the second area.

11. The method as recited in claim 10 further comprising:
    generating a first steady state temperature based on the first change in power density;
    generating a first error signal based on comparing the first steady state temperature to a first reference temperature;
    generating the first supply current based, at least in part, on the first error signal;
    generating a second steady state temperature based on the second change in power density;
    generating a second error signal based on comparing the second steady state temperature to a second reference temperature; and
    generating the second supply current based, at least in part, on the second error signal.

12. The method as recited in claim 11 wherein the first reference temperature is the same as the second reference temperature.

13. The method as recited in claim 11 wherein the first reference temperature corresponds to the first area and the second reference temperature corresponds to the second area and the first and second reference temperatures are different.

14. The method as recited in claim 9 further comprising:
    supplying the first supply current from the first TEC element to a third TEC element electrically coupled to the first TEC element.

15. The method as recited in claim 9 further comprising actively controlling a first plurality of TECs in the TEC grid and not actively controlling at least one TEC element in the TEC grid and keeping the at least one TEC element in the TEC grid in a permanent off state.

16. The method as recited in claim 9 further comprising: removing heat from the TEC grid using liquid cooling.

17. The method as recited in claim 9 further comprising: logically grouping a first plurality of TEC elements in the TEC grid by supplying identical supply currents to each of the first plurality of TEC elements and supplying a different supply current to at least another of the TEC elements in the TEC grid.

18. An apparatus comprising:
a plurality of thermal electric cooler (TEC) elements formed in a TEC grid;
control logic configured to dynamically vary a supply current supplied to a first TEC element in the TEC grid according to a change in power density respectively associated with an area cooled by the first TEC element;
wherein the control logic is configured to generate a steady state temperature based on the change in power density and to compare the steady state temperature to a reference temperature and generate an error signal indicative thereof;
wherein the supply current is varied according to the error signal; and
wherein the control logic is configured to actively control a first plurality of TEC elements in the TEC grid according to cooling needs and to not actively control at least a second TEC element in the TEC grid.

19. The apparatus as recited in claim 18, wherein the second TEC element is kept in a permanent off state.

20. The apparatus as recited in claim 18, further comprising:
a switch controlled by the control logic to selectively couple together two TEC elements in the TEC grid during run time to selectively provide a path for a first supply current to flow from one of the two TEC elements to another of the two TEC elements according to control of the switch.

* * * * *